(12) United States Patent
Hikita et al.

(10) Patent No.: US 8,538,220 B2
(45) Date of Patent: Sep. 17, 2013

(54) MANUFACTURING METHOD OF OPTICAL WAVEGUIDE DEVICE AND OPTICAL WAVEGUIDE DEVICE OBTAINED THEREBY

(75) Inventors: Takami Hikita, Ibaraki (JP); Junichi Fujisawa, Ibaraki (JP); Yusuke Shimizu, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 632 days.

(21) Appl. No.: 12/562,284

(22) Filed: Sep. 18, 2009

(65) Prior Publication Data
US 2010/0067849 A1    Mar. 18, 2010

Related U.S. Application Data

(60) Provisional application No. 61/101,823, filed on Oct. 1, 2008.

(30) Foreign Application Priority Data

Sep. 18, 2008  (JP) ................................. 2008-239346

(51) Int. Cl.
*G02B 6/10*   (2006.01)
(52) U.S. Cl.
USPC ......................................................... 385/129
(58) Field of Classification Search
USPC ......................................................... 385/129
See application file for complete search history.

(56) References Cited

U.S. PATENT DOCUMENTS

| 7,330,612 | B2 | 2/2008 | Nakashiba et al. |
| 2004/0146263 | A1* | 7/2004 | Mune et al. ................... 385/129 |
| 2005/0205885 | A1 | 9/2005 | Nakagawa et al. |
| 2007/0189661 | A1* | 8/2007 | Nakashiba et al. ............. 385/14 |

(Continued)

FOREIGN PATENT DOCUMENTS

| CN | 85107650 A | 7/1986 |
| CN | 101051102 A | 10/2007 |

(Continued)

OTHER PUBLICATIONS

Japanese Office Action dated Jul. 17, 2012, corresponding in Japanese Patent Application No. 2008-239346, (4 pages). With English Translation.

(Continued)

*Primary Examiner* — Uyen Chau N Le
*Assistant Examiner* — Hoang Tran
(74) *Attorney, Agent, or Firm* — Westerman, Hattori, Daniels & Adrian, LLP (57) ABSTRACT

A manufacturing method of an optical waveguide device and an optical waveguide device obtained thereby. An under cladding layer is formed on the front surface of a colored-layer-coated PET substrate including a PET substrate portion and a colored layer of a color that absorbs irradiation light and formed on the back surface of the PET substrate portion, and then a photosensitive resin layer for the formation of cores is formed thereon. In forming the cores, when the irradiation light reaches the bottom surface of the PET substrate portion, most of the irradiation light is absorbed by the colored layer, so that there is little irradiation light reflected from the bottom surface of the PET substrate portion. This significantly reduces the irradiation light reflected diffusely from the PET substrate portion and reaching the photosensitive resin layer to thereby effectively suppress the surface roughening of the side surfaces of the cores.

1 Claim, 5 Drawing Sheets (56) References Cited

U.S. PATENT DOCUMENTS

| | | |
|---|---|---|
| 2007/0227193 A1 | 10/2007 | Shimizu |
| 2008/0107881 A1 | 5/2008 | Nakashiba et al. |
| 2008/0113168 A1 | 5/2008 | Nakashiba et al. |
| 2009/0257707 A1 | 10/2009 | Shibata et al. |
| 2010/0009210 A1* | 1/2010 | Kitte et al. .................... 428/523 |

FOREIGN PATENT DOCUMENTS

| | | |
|---|---|---|
| GB | 2170649 A | 8/1986 |
| JP | 10-117057 A | 5/1998 |
| JP | 2004-341454 A | 12/2004 |
| JP | 2008-530317 A | 8/2008 |
| WO | 01/27696 A1 | 4/2001 |
| WO | 2006086841 A1 | 8/2006 |
| WO | 2008023517 A1 | 2/2008 |

OTHER PUBLICATIONS

Chinese Office Action dated Apr. 6, 2012, issued in corresponding Chinese Patent Application No. 200910171865.3.

Extended European Search Report dated Aug. 16, 2012, issued in corresponding European Patent Application No. 09168989.3.

\* cited by examiner

PRIOR ART

FIG. 4B

PRIOR ART

FIG. 4C

PRIOR ART

FIG. 4D

PRIOR ART

F I G. 5A

PRIOR ART

F I G. 5B

PRIOR ART

F I G. 6

PRIOR ART

MANUFACTURING METHOD OF OPTICAL WAVEGUIDE DEVICE AND OPTICAL WAVEGUIDE DEVICE OBTAINED THEREBY

RELATED APPLICATIONS

This application claims the benefit of U.S. Provisional Application No. 61/101,823, filed Oct. 1, 2008, which is hereby incorporated by reference.

BACKGROUND OF THE INVENTION

1. Field of the Invention

The present invention relates to a manufacturing method of an optical waveguide device for widespread use in optical communications, optical information processing and other general optics, and an optical waveguide device obtained thereby.

2. Description of the Related Art

In general, an optical waveguide for an optical waveguide device is constructed such that cores serving as a passageway for light are formed in a predetermined pattern on a surface of an under cladding layer, and such that an over cladding layer is formed so as to cover the cores. Such an optical waveguide is typically formed on a surface of a substrate such as a metal substrate and the like, and is manufactured together with the substrate to provide an optical waveguide device.

Figure 4A:
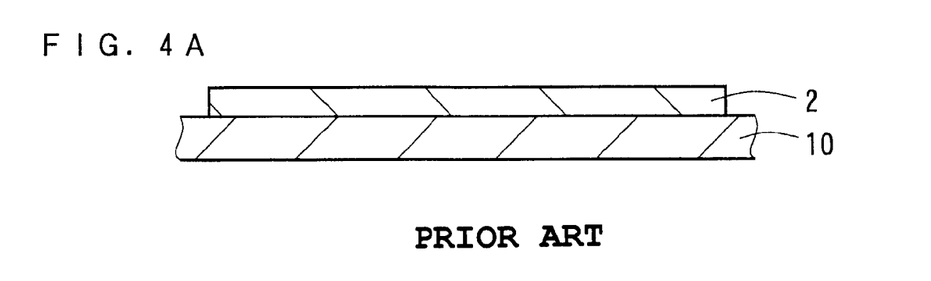
FIGS. 4A to 4D are illustrations schematically showing a conventional manufacturing method of an optical waveguide device.
Figure 4B:
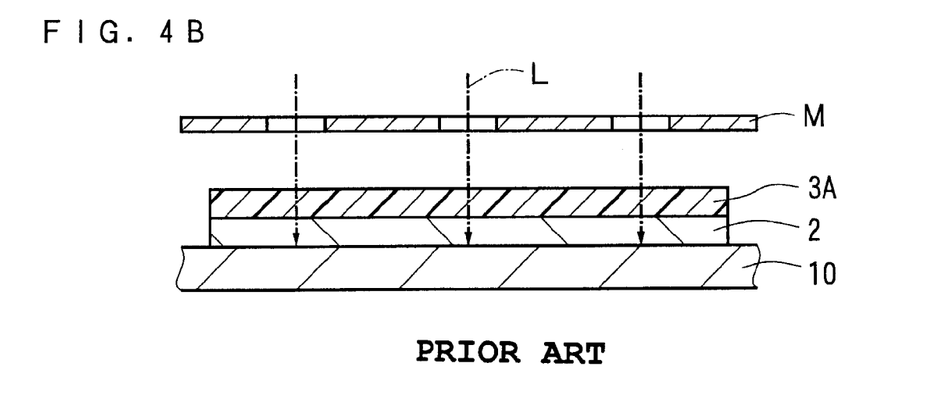
Figure 4C:
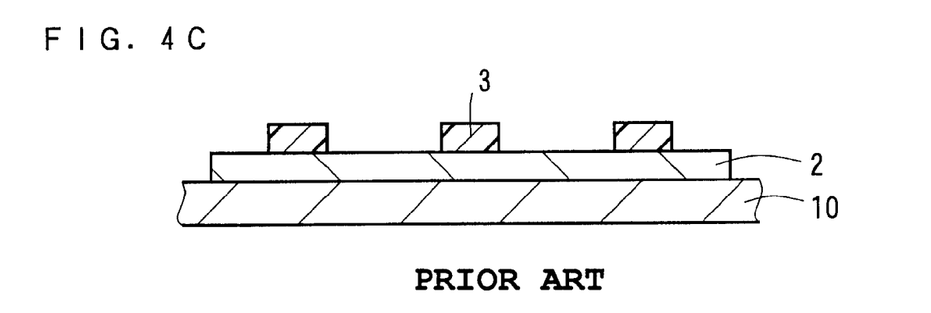
Figure 4D:
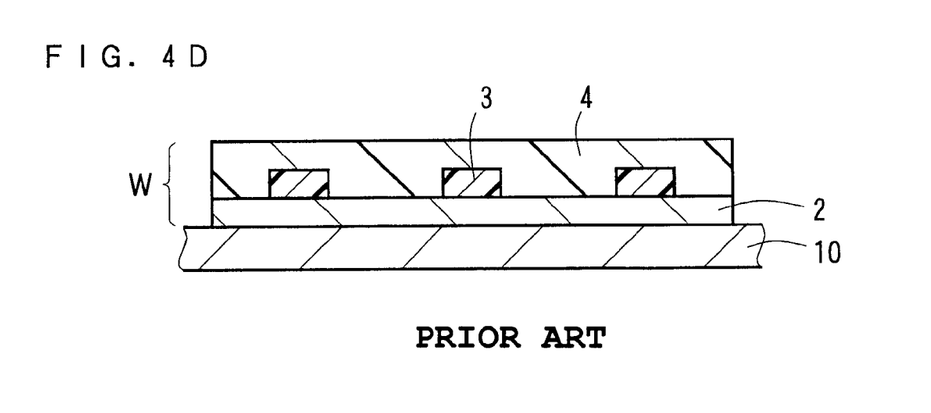

A conventional manufacturing method of such an optical waveguide device is as follows. First, as shown in FIG. 4A, an under cladding layer 2 is formed on a surface of a substrate 10. Then, as shown in FIG. 4B, a photosensitive resin for the formation of cores is applied to a surface of the under cladding layer 2 to form a photosensitive resin layer 3A. Next, irradiation light L is directed through a photomask M formed with an opening pattern corresponding to the pattern of the cores toward the above-mentioned photosensitive resin layer 3A. The irradiation light L is caused to reach the above-mentioned photosensitive resin layer 3A through openings of the above-mentioned opening pattern, thereby exposing portions of the photosensitive resin layer 3A thereto. The above-mentioned irradiation light L is directed to the above-mentioned photosensitive resin layer 3A at right angles thereto. A photoreaction proceeds in the portions exposed to the irradiation light L so that the exposed portions are hardened. Then, development is performed using a developing solution to dissolve away unexposed portions, as shown in FIG. 4C. The remaining exposed portions become cores 3 in a predetermined pattern. The cores 3 are typically formed to be rectangular in sectional configuration. Thereafter, as shown in FIG. 4D, an over cladding layer 4 is formed on the surface of the above-mentioned under cladding layer 2 so as to cover the cores 3. In this manner, an optical waveguide W is formed on the surface of the above-mentioned substrate (see, for example, Japanese Patent Application Laid-Open No. 2004-341454).

DISCLOSURE OF THE INVENTION

Figure 5A:
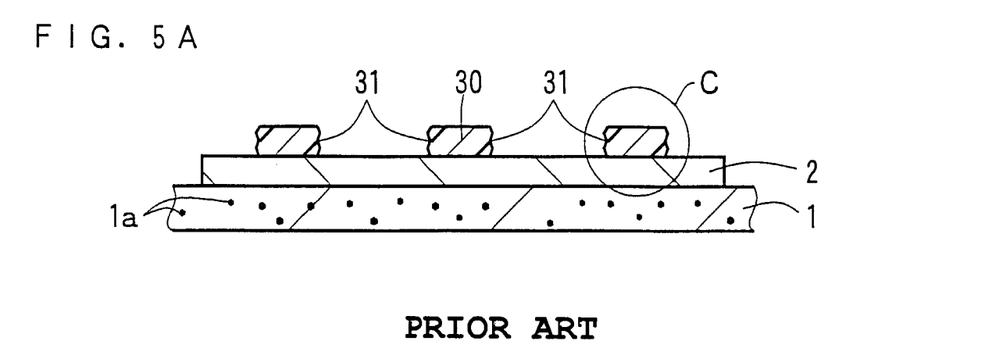
FIG. 5A is a sectional view schematically showing the formation of cores in the above-mentioned conventional manufacturing method of the optical waveguide device.
Figure 5B:
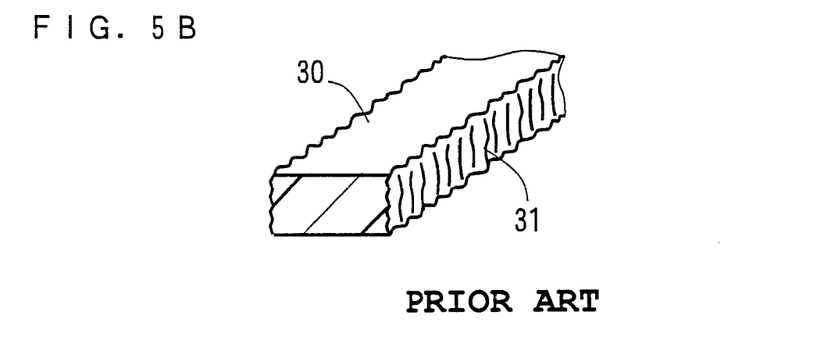
FIG. 5B is a view drawn based on a photograph of a core enclosed with a circle C of FIG. 5A.

In such a conventional method, however, the side surfaces 31 of cores 30 have been formed as roughened surfaces in some cases, as shown in FIGS. 5A and 5B. An optical waveguide having such cores 30 presents a problem in that the propagation losses of light propagating inside the cores 30 are increased. FIG. 5B is a view drawn based on a photograph in perspective of a core 30 enclosed with a circle C of FIG. 5A which is magnified 700 times with an electron microscope. By magnifying the core 30 700 times with the electron microscope in this manner, it can be seen that the side surfaces 31 of the cores 30 are formed as roughened surfaces.

Figure 6:
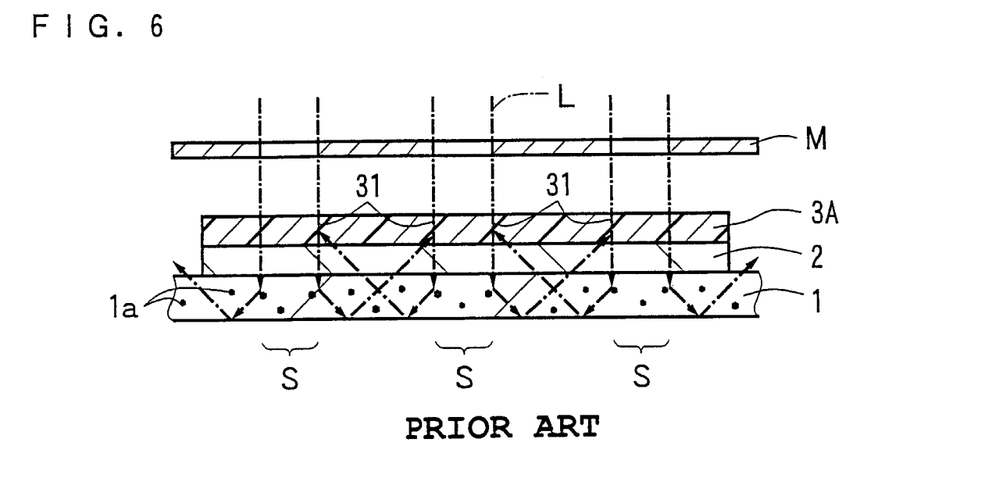
FIG. 6 is an illustration schematically showing a situation in the step of forming the cores in the above-mentioned conventional manufacturing method of the optical waveguide device.

The present inventors have made studies to diagnose the cause of the formation of the side surfaces 31 of the cores 30 as the roughened surfaces. In the course of the studies, the present inventors have found that the surface roughening of the side surfaces 31 of the above-mentioned cores 30 occurs, as shown in FIG. 5A, when a substrate 1 (referred to hereinafter as a "PET substrate") made of a material containing polyethylene terephthalate (PET) as a main component is used as the above-mentioned substrate 10 (with reference to FIGS. 4A to 4D). As a result of further studies, it has been found that the above-mentioned PET substrate 1 contains an additive component such as a lubricant material 1a, as shown in FIG. 6, and the irradiation light L for use in the exposure in the above-mentioned core formation step impinges upon and is reflected from the additive component such as the lubricant material 1a whereby the path of the irradiation light L is made irregular. It has also been found that most of the irradiation light L reaches the bottom surface (the surface corresponding to the back surface) of the above-mentioned PET substrate 1. That is, in the above-mentioned core formation step, the irradiation light L for use in the exposure is transmitted through the photosensitive resin layer 3A for the core formation and the under cladding layer 2, and thereafter enters the interior of the above-mentioned PET substrate 1, as shown in FIG. 6. In the above-mentioned PET substrate 1, the irradiation light L impinges upon the above-mentioned lubricant material 1a and the like so that the path thereof is made irregular, and reaches the bottom surface of the above-mentioned PET substrate 1 at an angle. In general, the back surface of the above-mentioned PET substrate 1 is in contact with a mounting surface of a mounting table and the like for placing the PET substrate 1 thereon, the mounting surface being impervious to the irradiation light L. For this reason, the irradiation light L reaching the bottom surface of the above-mentioned PET substrate 1 does not exit from the back surface of the above-mentioned PET substrate 1 but is reflected from the bottom surface of the PET substrate 1. Then, since the irradiation light L reaches the bottom surface of the above-mentioned PET substrate 1 at an angle as mentioned earlier, the irradiation light L reflected from the bottom surface of the PET substrate 1 is reflected from the bottom surface thereof obliquely upwardly. Thereafter, the reflected irradiation light L impinges upon the above-mentioned lubricant material 1a and the like in the above-mentioned PET substrate 1 so that the path thereof is made irregular, and then exits from the front surface of the PET substrate 1 obliquely upwardly. The irradiation light L exiting obliquely upwardly is transmitted through the above-mentioned under cladding layer 2 obliquely upwardly from below. Then, boundary surfaces (surfaces which are to become the side surfaces 31) for the patterning of the cores 30 are exposed to the irradiation light L directed obliquely from below in future core regions S included in the photosensitive resin layer 3A for the core formation. This exposure to the light directed obliquely from below comes from the diffuse reflection resulting from the lubricant material 1a and the like contained in the above-mentioned PET substrate 1 as mentioned earlier, and is uneven. Thus, it has been found that an unwanted photoreaction proceeds unevenly at the surfaces which are to become the side surfaces 31 of the cores 30 because of the above-mentioned exposure to the light directed obliquely from below to result in the formation of the side surfaces 31 of the cores 30 as the roughened surfaces. In other words, the surfaces which are to become the side surfaces 31 of the cores 30 show variations in the degree of exposure to light or have both the unexposed portions and the exposed portions because of the diffuse reflection of the above-mentioned irradiation light L. In a subsequent step of development, the portions low in the degree of exposure to light and the unexposed portions of the surfaces which are to become the side surfaces 31 of the above-mentioned cores 30 are dissolved away, and the portions high in the degree of exposure to light and the exposed portions remain unremoved. Thus, the side surfaces 31 of the cores 30 are formed as the roughened surfaces.

In view of the foregoing, it is an object of the present invention to provide a manufacturing method of an optical waveguide device capable of suppressing the surface roughening of core side surfaces of an optical waveguide when the optical waveguide is formed on a surface of a PET substrate, and an optical waveguide device obtained thereby.

To accomplish the above-mentioned object, a first aspect of the present invention is intended for a method of manufacturing an optical waveguide device, which comprises the steps of: forming an under cladding layer on the front surface of a substrate made of a material containing polyethylene terephthalate as a main component; forming a photosensitive resin layer for core formation on a surface of the under cladding layer; and directing irradiation light toward the photosensitive resin layer to expose the photosensitive resin layer in a predetermined pattern to the irradiation light, thereby forming exposed portions of the photosensitive resin layer into cores, wherein, in said step of forming the cores, the irradiation light directed toward said photosensitive resin layer is irradiation light transmitted through the photosensitive resin layer and through the front surface of said substrate, reaching the bottom surface of said substrate and reflected therefrom, and wherein said substrate is any one of the following substrates: (A) a colored-layer-coated substrate having a back surface on which a colored layer of a color that absorbs said irradiation light is formed, and (B) a colored substrate entirely colored in a color that absorbs said irradiation light.

A second aspect of the present invention is intended for an optical waveguide device obtained by the above-mentioned method of manufacturing the optical waveguide device, wherein a substrate included in the optical waveguide device and made of a material containing polyethylene terephthalate as a main component is any one of the following substrates: (A) a colored-layer-coated substrate having a back surface on which a colored layer of a color that absorbs said irradiation light is formed, and (B) a colored substrate entirely colored in a color that absorbs said irradiation light.

According to the present invention, the term "main component" refers to a component that makes up at least 50% of the whole, and is to be interpreted as including meaning that the whole consists only of the main component.

The present inventors have made studies of a method of significantly reducing the irradiation light reaching the photosensitive resin layer for the formation of the cores from the above-mentioned PET substrate side so as to prevent the core side surfaces of the optical waveguide from being formed as roughened surfaces when the optical waveguide is formed on the front surface of the PET substrate [the substrate made of the material containing polyethylene terephthalate (PET) as a main component]. In the course of the studies, the present inventors have focused attention on the fact that ultraviolet light or the like for use as the above-mentioned irradiation light is absorbed by a colored object. The present inventors have also focused on the fact that most of the above-mentioned irradiation light reaches the bottom surface of the above-mentioned PET substrate and is reflected therefrom, and have made further studies. As a result, the present inventors have found that, when the above-mentioned PET substrate is any one of the above-mentioned substrates (A) and (B), the above-mentioned irradiation light is absorbed by the colored layer of the above-mentioned colored-layer-coated substrate (A) and by the colored substrate (B) itself, so that the surface roughening of the core side surfaces is suppressed. Thus, the present inventors have attained the present invention.

In the manufacturing method of the optical waveguide device according to the present invention, when the PET substrate which forms the optical waveguide is the above-mentioned colored-layer-coated substrate (A) (a colored-layer-coated PET substrate), the under cladding layer is formed on the front surface (the surface on which the colored layer is not formed) of the colored-layer-coated PET substrate, and the photosensitive resin layer for the formation of the cores is formed thereon. Thereafter, the irradiation light is directed toward this photosensitive resin layer to expose the photosensitive resin layer in a predetermined pattern to the irradiation light, thereby forming exposed portions of the photosensitive resin layer into the cores. In this step of forming the cores, the irradiation light transmitted through the photosensitive resin layer for the formation of the cores and through the under cladding layer enters the above-mentioned colored-layer-coated PET substrate portion. Although the irradiation light impinges upon a lubricant material and the like contained in the PET substrate portion so that the path thereof is made irregular, most of the irradiation light reaches the bottom surface of the above-mentioned PET substrate portion. Since the colored layer of the color that absorbs the irradiation light is formed on the back surface of the above-mentioned PET substrate portion, most of the irradiation light that has reached the bottom surface of the above-mentioned PET substrate portion is absorbed by the above-mentioned colored layer, and there is little irradiation light reflected from the bottom surface of the above-mentioned PET substrate portion. This significantly reduces the irradiation light reflected from the bottom surface of the above-mentioned PET substrate portion, transmitted through the under cladding layer obliquely upwardly from below, and reaching the photosensitive resin layer for the formation of the cores. As a result, there is little irradiation light which causes the future side surfaces of the cores to become roughened surfaces because of the exposure of the future side surfaces thereto in the photosensitive resin layer for the formation of the cores. This effectively suppresses the surface roughening of the side surfaces of the cores.

On the other hand, when the PET substrate which forms the optical waveguide is the above-mentioned colored substrate (B) (a colored PET substrate), most of the irradiation light entering the above-mentioned colored PET substrate is absorbed in the above-mentioned colored PET substrate in the above-mentioned core formation step. This significantly reduces the irradiation light reflected from the bottom surface of the above-mentioned colored PET substrate, transmitted through the under cladding layer obliquely upwardly from below, and reaching the photosensitive resin layer for the formation of the cores. As a result, there is little irradiation light which causes the future side surfaces of the cores to become roughened surfaces because of the exposure of the future side surfaces thereto in the photosensitive resin layer for the formation of the cores. This effectively suppresses the surface roughening of the side surfaces of the cores. Additionally, when the PET substrate which forms the optical waveguide is the above-mentioned colored PET substrate (B), the colored PET substrate itself absorbs the irradiation light, as mentioned earlier, to cause little irradiation light to be reflected therefrom. This eliminates the need to provide a new layer for the absorption of the irradiation light to offer the advantage of preventing the increase in the total thickness of the optical waveguide device.

The optical waveguide device according to the present invention is that obtained by the above-mentioned manufacturing method. Thus, the surface roughening of the side surfaces of the cores is effectively suppressed. This reduces the propagation losses of light propagating inside the cores.

In particular, when the color that absorbs the above-mentioned irradiation light is black, the property of absorbing the irradiation light is excellent, and the surface roughening of the side surfaces of the cores is more effectively suppressed. This further reduces the propagation losses of light propagating inside the cores in the obtained optical waveguide device.

Next, embodiments according to the present invention will now be described in detail with reference to the drawings.

Figure 1A:
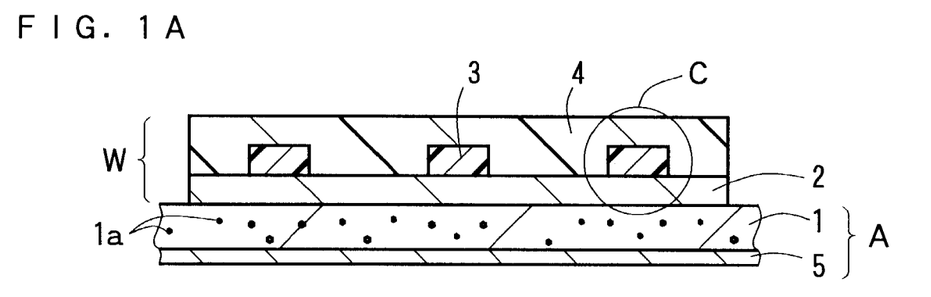
FIG. 1A is a sectional view schematically showing an optical waveguide device provided by a manufacturing method of an optical waveguide device according to one embodiment of the present invention.
Figure 1B:
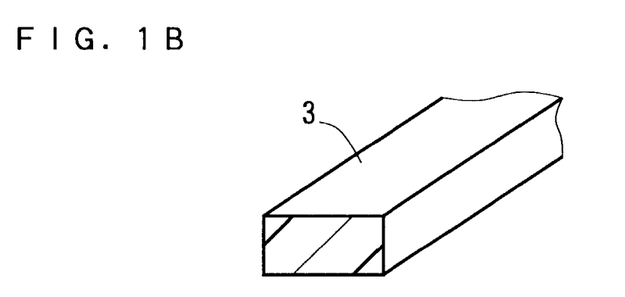
FIG. 1B is a view drawn based on a photograph of a core enclosed with a circle C of FIG. 1A.

FIG. 1A shows an optical waveguide device obtained by a manufacturing method of an optical waveguide device according to a first embodiment of the present invention. This optical waveguide device is constructed such that an optical waveguide W is formed on the front surface of a colored-layer-coated PET substrate A including a PET substrate 1 portion and a colored layer 5 of a color absorbing irradiation light formed on the back surface of this PET substrate 1 portion. This optical waveguide W includes an under cladding layer 2 formed on the front surface of the above-mentioned colored-layer-coated PET substrate A, and is manufactured in a manner to be described below. Specifically, a photosensitive resin layer 3A (with reference to FIG. 2B) is formed on a surface of the above-mentioned under cladding layer 2. Thereafter, irradiation light L is directed toward this photosensitive resin layer 3A to expose the photosensitive resin layer 3A in a predetermined pattern to the irradiation light L, thereby forming cores 3. Further, an over cladding layer 4 is formed over the cores 3 in a stacked manner. The optical waveguide W is thus manufactured. The colored layer 5 of the color that absorbs the above-mentioned irradiation light performs the function of absorbing the irradiation light L directed to the above-mentioned photosensitive resin layer 3A. FIG. 1B is a view drawn based on a photograph in perspective of a core 3 enclosed with a circle C of FIG. 1A which is magnified 700 times with an electron microscope.

DETAILED DESCRIPTION OF THE INVENTION

The manufacturing method of the optical waveguide device according to this embodiment will be described in detail.

First, the above-mentioned PET substrate 1 (with reference to FIG. 2A) is prepared. This PET substrate 1 is colorless and transparent. The PET substrate 1 used typically is commercially available. The PET substrate 1 commercially available inevitably contains an additive component such as a lubricant material 1a and the like in the course of the manufacture thereof. For example, a PET substrate having a thickness in the range of 20 μm to 1 mm is used as the above-mentioned PET substrate 1.

Then, as mentioned earlier, the colored layer 5 of the color that absorbs the irradiation light L such as ultraviolet light and the like for use in exposure of the photosensitive resin layer 3A for the formation of the cores 3 thereto in a subsequent step of forming the cores 3 (with reference to FIGS. 2B and 2C) is formed on a predetermined region of one surface (the back surface) of the above-mentioned PET substrate 1. This forms the colored-layer-coated PET substrate A which includes the above-mentioned PET substrate 1 portion and the above-mentioned colored layer 5. Examples of the color that absorbs the above-mentioned irradiation light L include black, red, blue, green, yellow and the like. Of these, a dark color is preferable from the viewpoint of its excellent property of absorbing the irradiation light L, and black is more preferable. Examples of the method of forming the above-mentioned colored layer 5 include a method of applying ink, coating or the like of the above-mentioned color, a method of performing a blackening process, and the like. The thickness of the above-mentioned colored layer 5 is typically in the range of 1 to 100 nm, preferably in the range of 50 to 75 nm.

Figure 2A:
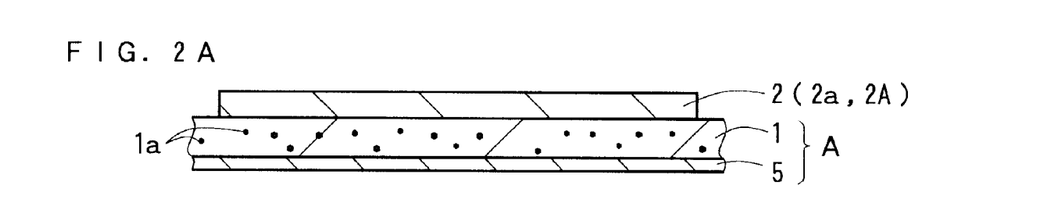
FIGS. 2A to 2D are illustrations schematically showing the manufacturing method of the optical waveguide device according to one embodiment of the present invention.

Then, as shown in FIG. 2A, a varnish prepared by dissolving a photosensitive resin for the formation of the under cladding layer 2 in a solvent is applied to a predetermined region of the other surface (the front surface) of the above-mentioned PET substrate 1 portion to form a coating layer 2a thereof. Examples of the above-mentioned photosensitive resin include photosensitive epoxy resins, and the like. The application of the above-mentioned varnish is achieved, for example, by a spin coating method, a dipping method, a casting method, an injection method, an ink jet method and the like. Then, the above-mentioned coating layer 2a is dried by a heating treatment at 50 to 120° C. for 10 to 30 minutes, as required. This provides a photosensitive resin layer 2A for the formation of the under cladding layer 2.

Next, the photosensitive resin layer 2A is exposed to irradiation light. Examples of the above-mentioned irradiation light for the exposure used herein include visible light, ultraviolet light, infrared light, X-rays, alpha rays, beta rays, gamma rays and the like. Preferably, ultraviolet light (with a wavelength 250 to 400 nm) is used. This is because the use of ultraviolet light achieves irradiation with large energy to provide a high rate of hardening, and an irradiation apparatus therefor is small in size and inexpensive to achieve the reduction in production costs. A light source of the ultraviolet light may be, for example, a low-pressure mercury-vapor lamp, a high-pressure mercury-vapor lamp, an ultra-high-pressure mercury-vapor lamp and the like. The dose of the ultraviolet light is typically 10 to 10000 mJ/cm$^2$, preferably 50 to 3000 mJ/cm$^2$.

After the above-mentioned exposure, a heating treatment is performed to complete a photoreaction. This heating treatment is performed at 80 to 250° C., preferably at 100 to 200° C., for 10 seconds to two hours, preferably for five minutes to one hour. This causes the above-mentioned photosensitive resin layer 2A to be formed into the under cladding layer 2, as shown in FIG. 2A. The thickness of the under cladding layer 2 is typically in the range of 1 to 50 μm, preferably in the range of 5 to 30 μm.

Figure 2B:
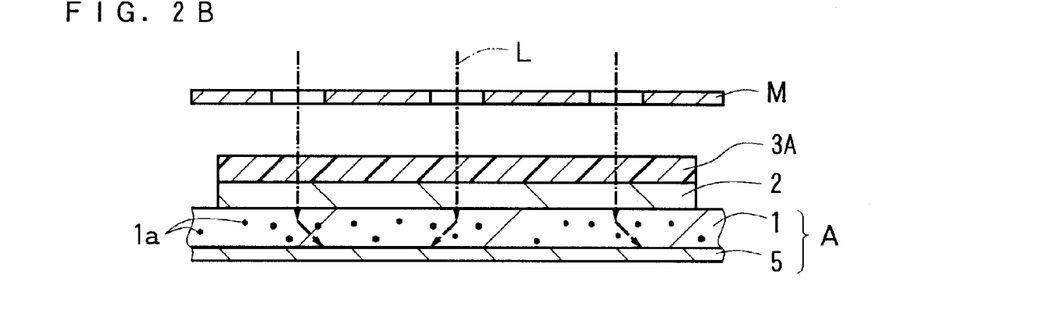

Then, as shown in FIG. 2B, the photosensitive resin layer 3A for the formation of the cores 3 (with reference to FIG. 2C) is formed on the surface of the above-mentioned under cladding layer 2. The formation of this photosensitive resin layer 3A is carried out in a manner similar to the process for forming the photosensitive resin layer 2A for the formation of the under cladding layer 2, which is described with reference to FIG. 2A. The material for the formation of the cores 3 used herein has a refractive index higher than that of the material for the formation of the above-mentioned under cladding layer 2 and the over cladding layer 4 (with reference to FIG. 2D) to be described later. This adjustment of the refractive indices may be made, for example, by adjusting the selection of the types of the materials for the formation of the under cladding layer 2, the cores 3 and the over cladding layer 4 described above and the composition ratio thereof.

Thereafter, a photomask M formed with an opening pattern corresponding to the cores 3 is placed over the photosensitive resin layer 3A for the formation of the above-mentioned cores 3. A portion of the above-mentioned photosensitive resin layer 3A corresponding to the above-mentioned opening pattern is exposed to the irradiation light L through this photomask M. This exposure is performed in a manner similar to that in the step of forming the under cladding layer 2 mentioned earlier. During the above-mentioned exposure, the above-mentioned irradiation light L is directed to the above-mentioned photosensitive resin layer 3A at right angles thereto to cause the photoreact ion to proceed in portions exposed to the irradiation, thereby hardening the exposed portions. This irradiation light L is transmitted through the above-mentioned photosensitive resin layer 3A and the above-mentioned under cladding layer 2, and thereafter enters the above-mentioned PET substrate 1 portion. In this PET substrate 1 portion, although the above-mentioned irradiation light L impinges upon the lubricant material 1a and the like contained in the PET substrate 1 portion so that the path thereof is made irregular, most of the irradiation light L reaches the bottom surface of the above-mentioned PET substrate 1 portion. Since the colored layer 5 of the color that absorbs the irradiation light L is formed on the back surface of the above-mentioned PET substrate 1 portion, most of the irradiation light L that has reached the bottom surface of the above-mentioned PET substrate 1 portion is absorbed by the above-mentioned colored layer 5, and there is little irradiation light L that is reflected from the bottom surface of the above-mentioned PET substrate 1 portion. Thus, the irradiation light L reflected from the bottom surface of the PET substrate 1 portion and transmitted through the under cladding layer 2 obliquely upwardly from below is significantly reduced. As a result, there is little irradiation light L to which the future side surfaces of the cores 3 are exposed due to the diffuse reflection thereof in the photosensitive resin layer 3A for the formation of the cores 3. This suppresses the surface roughening of the side surfaces of the cores 3.

Figure 2C:
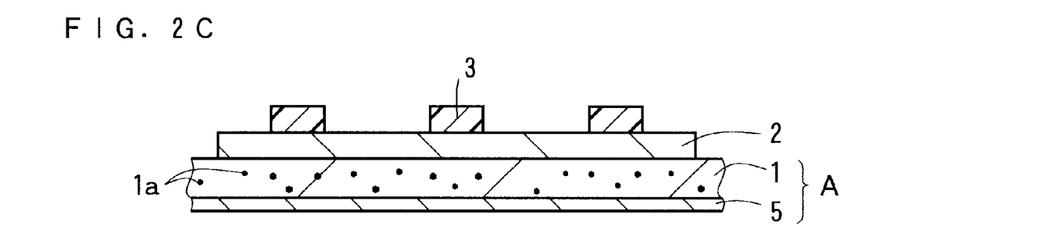

After the above-mentioned exposure, a heating treatment is performed in a manner similar to that in the step of forming the under cladding layer 2 mentioned earlier. Then, development is performed using a developing solution. This dissolves away unexposed portions of the above-mentioned photosensitive resin layer 3A to cause portions of the photosensitive resin layer 3A remaining on the under cladding layer 2 to be formed into the pattern of the cores 3, as shown in FIG. 2C. The above-mentioned development employs, for example, an immersion method, a spray method, a puddle method and the like. Examples of the developing solution used herein include an organic solvent, an organic solvent containing an alkaline aqueous solution, and the like. The developing solution and conditions for the development are selected as appropriate depending on the composition of a photosensitive resin composition.

After the above-mentioned development, the developing solution remaining on the surface and the like of the photosensitive resin layer 3A formed in the pattern of the cores 3 is removed by a heating treatment. This heating treatment is typically performed at 80 to 120° C. for 10 to 30 minutes. This causes the photosensitive resin layer 3A formed in the pattern of the above-mentioned cores 3 to be formed into the cores 3. The surface roughening of the side surfaces of the cores 3 is suppressed, as mentioned earlier. The thickness of the above-mentioned cores 3 is typically in the range of 5 to 150 μm, preferably in the range of 5 to 100 μm. The width of the cores 3 is typically in the range of 5 to 150 μm, preferably in the range of 5 to 100 μm.

Figure 2D:
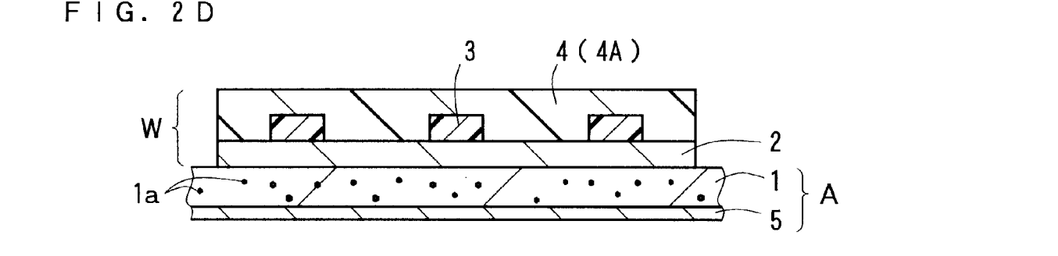

Next, as shown in FIG. 2D, a photosensitive resin layer 4A for the formation of the over cladding layer 4 is formed on the surface of the above-mentioned under cladding layer 2 so as to cover the cores 3. The formation of this photosensitive resin layer 4A is carried out in a manner similar to the process for forming the photosensitive resin layer 2A for the formation of the under cladding layer 2, which is described with reference to FIG. 2A. Thereafter, exposure to light, a heating treatment and the like are performed in a manner similar to those in the step of forming the under cladding layer 2 to cause the above-mentioned photosensitive resin layer 4A to be formed into the over cladding layer 4. The thickness of the over cladding layer 4 (the thickness as measured from the surface of the cores 3) is typically in the range of 5 to 100 μm, preferably in the range of 10 to 80 μm.

In this manner, an optical waveguide device is provided in which the optical waveguide W including the under cladding layer 2, the cores 3 and the over cladding layer 4 described above is formed on the front surface of the colored-layer-coated PET substrate A. The optical waveguide W in this optical waveguide device are small in light propagation losses to achieve good propagation of light because the surface roughening of the side surfaces of the cores 3 is suppressed.

Figure 3:
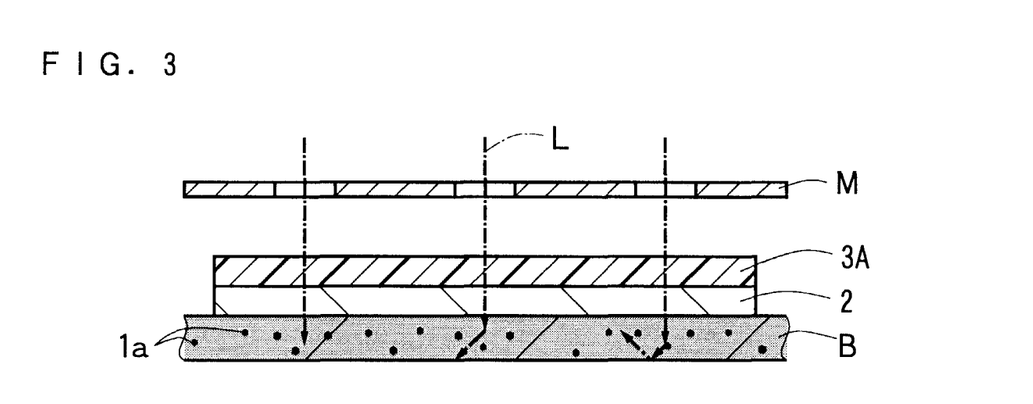
FIG. 3 is an illustration schematically showing the step of irradiating a photosensitive resin layer for the formation of cores with irradiation light in a manufacturing method of an optical waveguide device according to a second embodiment of the present invention.

FIG. 3 shows the step of irradiating the photosensitive resin layer 3A for the formation of the cores 3 with the irradiation light L in a manufacturing method of an optical waveguide device according to a second embodiment of the pre sent invention. In this embodiment, a colored PET substrate B that is colored and transparent because of the coloring of the PET substrate B itself in a color that absorbs the irradiation light L is used as the PET substrate. This colored PET substrate B used typically is also commercially available, and contains an additive component such as the lubricant material 1a and the like. Other parts are similar to those of the above-mentioned first embodiment, and like reference numerals and characters are used to designate similar parts.

In this embodiment, most of the irradiation light L directed to the above-mentioned photosensitive resin layer 3A at right angles thereto, transmitted through the above-mentioned photosensitive resin layer 3A and the above-mentioned under cladding layer 2 and then entering the above-mentioned colored PET substrate B is absorbed in the above-mentioned colored PET substrate B because the colored PET substrate B is of the color that absorbs the irradiation light L. Thus, the irradiation light L reflected from the bottom surface of the colored PET substrate B and transmitted through the under cladding layer 2 obliquely upwardly from below is significantly reduced. As a result, there is little irradiation light L to which the future side surfaces of the cores 3 are exposed due to the diffuse reflection thereof in the photosensitive resin layer 3A for the formation of the cores 3. This suppresses the surface roughening of the side surfaces of the cores 3.

In the above-mentioned embodiments, the optical waveguide W is used either while being formed on the surfaces of the colored-layer-coated PET substrate A and the colored PET substrate B or after being removed from the colored-layer-coated PET substrate A and the colored PET substrate B described above.

In the above-mentioned embodiments, the over cladding layer 4 is formed. However, this over cladding layer 4 may be dispensed with in some instances.

Next, inventive examples of the present invention will be described in conjunction with a comparative example. It should be noted that the present invention is not limited to the inventive examples.

INVENTIVE EXAMPLE 1

Colored-Layer-Coated PET Substrate

A colorless transparent PET substrate (manufactured by Toray Industries, Inc., Type T60, under the product designation 188, and having a thickness of 188 μm) was prepared. Then, black alcohol-based ink was applied to one surface (the back surface) of the PET substrate by using an oil-based marking pen to form a colored layer having a thickness of 50 nm.

Material for Formation of Under Cladding Layer and Over Cladding Layer

A material for formation of an under cladding layer and an over cladding layer was prepared by mixing 35 parts by weight of bisphenoxyethanol fluorene glycidyl ether (component A) represented by the following general formula (1), 40 parts by weight of 3',4'-epoxycyclohexyl methyl-3,4-epoxycyclohexane carboxylate which is an alicyclic epoxy resin (CELLOXIDE 2021P manufactured by Daicel Chemical Industries, Ltd.) (component B), 25 parts by weight of (3'4'-epoxycyclohexane)methyl-3',4'-epoxycyclohexyl-carboxylate (CELLOXIDE 2081 manufactured by Daicel Chemical Industries, Ltd.) (component C), and 2 parts by weight of a 50% propione carbonate solution of 4,4'-bis[di(β-hydroxyethoxy)phenylsulfinio]phenyl-sulfide-bis-hexafluoroantimonate (component D).

(1)

wherein $R_1$ to $R_6$ are hydrogen atoms, and n=1.

Material for Formation of Cores

A material for formation of cores was prepared by dissolving 70 parts by weight of the aforementioned component A, 30 parts by weight of 1,3,3-tris{4-[2-(3-oxetanyl)]butoxyphenyl}butane and one part by weight of the aforementioned component D in ethyl lactate.

Manufacture of Optical Waveguide Device

The material for the formation of the above-mentioned under cladding layer was applied to the front surface (a surface on which the colored layer was not formed) of the above-mentioned colored-layer-coated PET substrate by using a spin coater to form a coating layer having a thickness of 20 μm. Thereafter, the entire surface of the coating layer was irradiated with ultraviolet light from an ultra-high-pressure mercury-vapor lamp so as to be exposed to the ultraviolet light at an integrated dose of 1000 mJ/cm² (based on an i-line standard). Subsequently, the exposed coating layer was allowed to stand for ten minutes on a hot plate at 120° C. so that the reaction was completed. In this manner, the under cladding layer was formed.

Then, the material for the formation of the above-mentioned cores was applied to a surface of the above-mentioned under cladding layer by using a spin coater, and thereafter was allowed to stand for five minutes on a hot plate at 70° C. so that the solvent was volatilized. Thus, a photosensitive resin layer for the formation of the cores was formed. Next, ultraviolet light was emitted from an ultra-high-pressure mercury-vapor lamp through a glass mask formed with a predetermined opening pattern (having an opening width of 50 μm, and a spacing of 200 μm between adjacent openings) so that the photosensitive resin layer was exposed to the ultraviolet light at an integrated dose of 2000 mJ/cm² (based on an i-line standard). Thereafter, the exposed photosensitive resin layer was allowed to stand for ten minutes on a hot plate at 120° C. so that the reaction was completed. Next, development was performed with a spray developing machine using a developing solution including 90% by weight of γ-butyrolactone. Thus, the cores (having a height of 50 μm) was formed.

Then, the material for the formation of the above-mentioned over cladding layer was applied to the surface of the above-mentioned under cladding layer by using a spin coater so as to cover the above-mentioned cores. Thereafter, the over cladding layer was formed in a manner similar to that in the method of forming the above-mentioned under cladding layer. In this manner, an optical waveguide device (having a total thickness of 100 μm) was manufactured.

INVENTIVE EXAMPLE 2

An optical waveguide device was manufactured by forming the under cladding layer, the cores and the over cladding layer directly on the front surface of a black transparent colored PET substrate (manufactured by Mitsubishi Plastics, Inc., Type Z608E, under the product designation U07-17 MB, and having a thickness of 25 μm) in a manner similar to that in Inventive Example 1 described above.

COMPARATIVE EXAMPLE 1

An optical waveguide device was manufactured by forming the under cladding layer, the cores and the over cladding layer directly on the front surface of a colorless transparent PET substrate similar to that in Inventive Example 1 described above without forming a colored layer on the back surface of the colorless transparent PET substrate.

Evaluation of Core Side Surfaces

The side surfaces of the cores of the optical waveguide devices in Inventive Examples 1 and 2, and Comparative Example 1 described above were observed with a scanning electron microscope. As a result, the side surfaces of the cores in Comparative Example 1 were formed as roughened surfaces, but the side surfaces of the cores in Inventive Examples 1 and 2 were much smoother than those in Comparative Example 1.

Measurement of Light Propagation Loss

The optical waveguide devices in Inventive Examples 1 and 2, and Comparative Example 1 described above were cut using a dicing machine (DAD522 manufactured by Disco Corporation) so that the end surfaces of the cores were uncovered. Also, the above-mentioned optical waveguide devices were cut to a length of 10 cm, and light propagation losses were measured. As a result, the light propagation loss of the optical waveguide device in Inventive Example 1 was 1.96 dB/10 cm, the light propagation loss in Inventive Example 2 was 1.57 dB/10 cm, and the light propagation loss in Comparative Example 1 was 3.80 dB/10 cm.

The above-mentioned results show that there is little diffuse reflection from the colored-layer-coated PET substrate and from the colored PET substrate in Inventive Examples 1 and 2 because the surface roughening of the core side surfaces is suppressed in Inventive Examples 1 and 2, as compared with Comparative Example 1. This is because most of the ultraviolet light used in the core formation step is absorbed by the colored layer in Inventive Example 1 and by the colored PET substrate in Inventive Example 2.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An optical waveguide device comprising: a substrate made of a material containing polyethylene terephthalate as a main component; and an optical waveguide formed on a surface of said substrate including an under cladding layer and cores, and said cores made of a material containing the part of a photosensitive resin layer expose by the irradiation light for the formation of said cores, said substrate being colored-layer-coated substrate having a back surface on which a colored layer of a color that absorbs said irradiation light is formed wherein the color that absorbs said irradiation light is black.

* * * * *